United States Patent
Votaw et al.

(10) Patent No.: US 8,510,221 B2
(45) Date of Patent: Aug. 13, 2013

(54) INTELLIGENT ATM CHECK IMAGE DEPOSIT ENGINE

(75) Inventors: Elizabeth S. Votaw, Potomac, MD (US); James J. Siekman, Charlotte, NC (US)

(73) Assignee: Bank of America, Charlotte, NC (US)

( * ) Notice: Subject to any disclaimer, the term of this patent is extended or adjusted under 35 U.S.C. 154(b) by 331 days.

(21) Appl. No.: 12/841,731

(22) Filed: Jul. 22, 2010

(65) Prior Publication Data

US 2012/0023017 A1 Jan. 26, 2012

(51) Int. Cl.
*G06Q 40/00* (2012.01)
*G06K 9/00* (2006.01)

(52) U.S. Cl.
USPC .............................................. 705/43; 382/138

(58) Field of Classification Search
USPC ............................... 705/35–45; 382/137–139
See application file for complete search history.

(56) References Cited

U.S. PATENT DOCUMENTS

| | | | |
|---|---|---|---|
| 7,377,425 B1 * | 5/2008 | Ma et al. | 235/379 |
| 7,840,485 B1 * | 11/2010 | Warren et al. | 705/43 |
| 7,873,200 B1 * | 1/2011 | Oakes et al. | 382/137 |
| 7,876,949 B1 * | 1/2011 | Oakes et al. | 382/137 |
| 7,885,451 B1 * | 2/2011 | Walls et al. | 382/137 |
| 8,255,318 B2 * | 8/2012 | Royyuru | 705/38 |
| 8,301,565 B2 * | 10/2012 | Cantley et al. | 705/43 |
| 8,321,349 B2 * | 11/2012 | Goodall et al. | 705/45 |
| 2006/0080252 A1 * | 4/2006 | Doran | 705/43 |
| 2006/0106717 A1 * | 5/2006 | Randle et al. | 705/45 |
| 2007/0084911 A1 * | 4/2007 | Crowell | 235/379 |
| 2007/0262137 A1 * | 11/2007 | Brown | 235/380 |
| 2007/0288382 A1 * | 12/2007 | Narayanan et al. | 705/45 |
| 2008/0097907 A1 * | 4/2008 | Till et al. | 705/45 |
| 2009/0276358 A1 * | 11/2009 | Dutta et al. | 705/43 |
| 2009/0287594 A1 * | 11/2009 | Updike | 705/35 |
| 2009/0292569 A1 * | 11/2009 | Statland et al. | 705/7 |
| 2009/0319424 A1 * | 12/2009 | Calman et al. | 705/42 |
| 2009/0327888 A1 * | 12/2009 | Woolf et al. | 715/704 |
| 2010/0138343 A1 * | 6/2010 | Davila et al. | 705/43 |
| 2010/0161489 A1 * | 6/2010 | Goodall et al. | 705/45 |
| 2010/0250418 A1 * | 9/2010 | Schrick et al. | 705/35 |
| 2010/0306111 A1 * | 12/2010 | Slater et al. | 705/45 |
| 2011/0191242 A1 * | 8/2011 | Allen | 705/43 |
| 2011/0238550 A1 * | 9/2011 | Reich et al. | 705/35 |
| 2011/0251956 A1 * | 10/2011 | Cantley et al. | 705/43 |
| 2011/0276483 A1 * | 11/2011 | Saegert et al. | 705/43 |
| 2012/0023017 A1 * | 1/2012 | Votaw et al. | 705/43 |

OTHER PUBLICATIONS

Bailey, Tom, "Adroit ATM—Mixes of cash, checks no problem; deposists can go later as well", The Commercial Appeal, Jun. 2009: D.1., pp. 1-4.*
Hendy, Jeffrey; Xu, Kai; Welsman-Dinelle, Michael; Viriyakattiyaporn, Petcharat; Zogbhi, Susana, "Next Generation ATM: Phase II Report", Nov. 2, 2007, pp. 1-27.*

* cited by examiner

*Primary Examiner* — Mohammad Z Shaikh
(74) *Attorney, Agent, or Firm* — Banner & Witcoff, Ltd.; Michael A. Springs

(57) ABSTRACT

Systems and methods for recognizing a check deposit received in a self-service financial transaction device are described. A check is received from a customer associated with an entity for deposit into an account of the entity. Upon determining a that an amount of the check received for deposit cannot be determined from a scanned image of the check, deposit transaction data for the customer is collected and analyzed, including the frequency and timing of the customer's previous check deposits, the amount of the customer's previous check deposits, the payor of such deposits, and the like, to predict the amount of the currently received check.

20 Claims, 11 Drawing Sheets

Is this the check issued to you by _____ in the approximately every _____ . _____ ?

YES

NO

YES, but it is for a different amount

FIG. 5B

Is this check one of your usual deposits that you make every _____? If so, please identify the check below:

| Issued By | Amount | | |
|---|---|---|---|
| Individual A | $ XX.XX | Select | New Amount |
| Individual B | $ XX.XX | Select | New Amount |
| Company A | $ XXX.XX | Select | New Amount |
| Company B | $ XXX.XX | Select | New Amount |

This check is not one of my usual deposits listed above

FIG. 5D

INTELLIGENT ATM CHECK IMAGE DEPOSIT ENGINE

FIELD

Aspects of the present disclosure relate to a cash handling device. More specifically, aspects of the disclosure relate to identifying check deposits at a cash handling device based on customer transaction patterns.

BACKGROUND

Customers of financial institution entities regularly fulfill their business and personal banking needs by conducting transactions through various types of automated and computerized systems. Not only do these systems continue to provide fast and efficient alternatives to waiting for assistance from a customer representative of the entity (e.g., a bank teller) when the transaction at hand is relatively simple and straightforward, such as a cash withdrawal, but such systems have also advanced to where many transactions that can be completed in-person with the assistance of a customer representative can also be completed without the assistance of a customer representative. For example, automated teller machines (ATMs) are able provide customers (e.g., users, customers, clients, individuals, and the like) with the ability to withdraw and/or deposit money, request cash advances on one or more credit cards, review and/or print account balances and activity reports, as well as numerous other transaction types.

One of the more useful features of most ATMs is their ability to receive and process monetary deposits, such as checks, cash, and other forms of currency. For example, customers wishing to deposit a check may, after submitting their identification and authorization information, insert their check into a deposit slot of the ATM where the check is scanned by, e.g., a scanning device of the ATM, and an image created for presentation to the customer on a display screen of the ATM. The scanned image of the check is presented to the customer for confirmation of the monetary amount of the check, which is determined by the ATM during the scanning process. Specifically, the deposited check is scanned for optical character recognition (OCR) and/or magnetic ink character recognition (MICR), which allow various attributes of the check, such as the amount, the payor, the date, and the like to be easily recognizable.

Unfortunately, a surprisingly large percentage of scanned checks fail the recognition process, thereby transferring the burden to the customer to manually enter the amount of the deposited check. Considering that ATMs and other such self-service devices are designed to be quick alternatives to entering a financial institution entity and interacting with a teller or other representative of the entity, requiring customers to manually enter check deposit amounts can negatively impact customer satisfaction. This is especially true for customers who routinely (e.g., daily, weekly, and the like) make check deposits at ATMs, primarily for reasons related to efficiency and ease-of-use.

BRIEF SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure are directed to a method and system for recognizing check deposits based on customer (e.g., customer, user, client, individual, and the like) behavior patterns identified from previously collected transaction data. A check deposit received at, for example, an automated teller machine (ATM), may be recognized according to numerous characteristics and circumstances surrounding the deposit, include the timing of the deposit, the monetary value of the deposit, the payor, and various other check attributes. Additionally, various aspects of the check deposit recognition method described herein may be used to supplement check deposit image recognition processes that utilize one or more types of scanning devices.

Other aspects of the present disclosure are directed to a method and system for receiving monetary funds, such as a check, from a customer associated with an entity (e.g., a financial institution entity) for deposit in an account of the entity. In one or more arrangements, a self-service financial transaction device (SSFTD) is provided to receive a check for deposit from a customer, determine that the amount of the check cannot be read from a scanned image of the check, ask the customer to confirm an identity of the check, and if the identity of the check is confirmed, determine the amount of the check accordingly.

This summary is provided to introduce a selection of concepts in a simplified form that are further described below in the Detailed Description. The summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein:

FIG. 5B is an illustrative user interface for confirming an identify of a check deposit according to one or more aspects described herein;

FIG. 5D is an illustrative user interface for confirming an identify of a check deposit according to one or more aspects described herein;

DETAILED DESCRIPTION

In the following description of various illustrative embodiments, reference is made to the accompanying drawings, which form a part hereof, and in which is shown by way of illustration various embodiments in which one or more aspects of the disclosure may be practiced. It is to be understood that other embodiments may be utilized and structural and functional modifications may be made without departing from the scope of the present disclosure.

By way of general introduction, aspects of the disclosure relate to providing a method and system for recognizing a check deposit received in a self-service financial transaction device (SSFTD) from a customer (e.g., customer, user, client, individual, and the like) based on previously collected deposit transaction data for the customer. As described herein, upon determining at an SSFTD (e.g., an automated teller machine (ATM)) that an amount of a check received from an customer for deposit cannot be determined from a scanned image of the check, the SSFTD analyzes deposit transaction data for the customer, including the frequency and timing of the customer's previous check deposits, the amount of the customer's previous check deposits, the payor of such deposits, and the like to predict the amount of the currently received check. In at least one arrangement, deposit transaction data for the customer is retrieved by the SSFTD from a database of an entity with which the customer is associated (e.g., the customer's financial institution).

Figure 1:
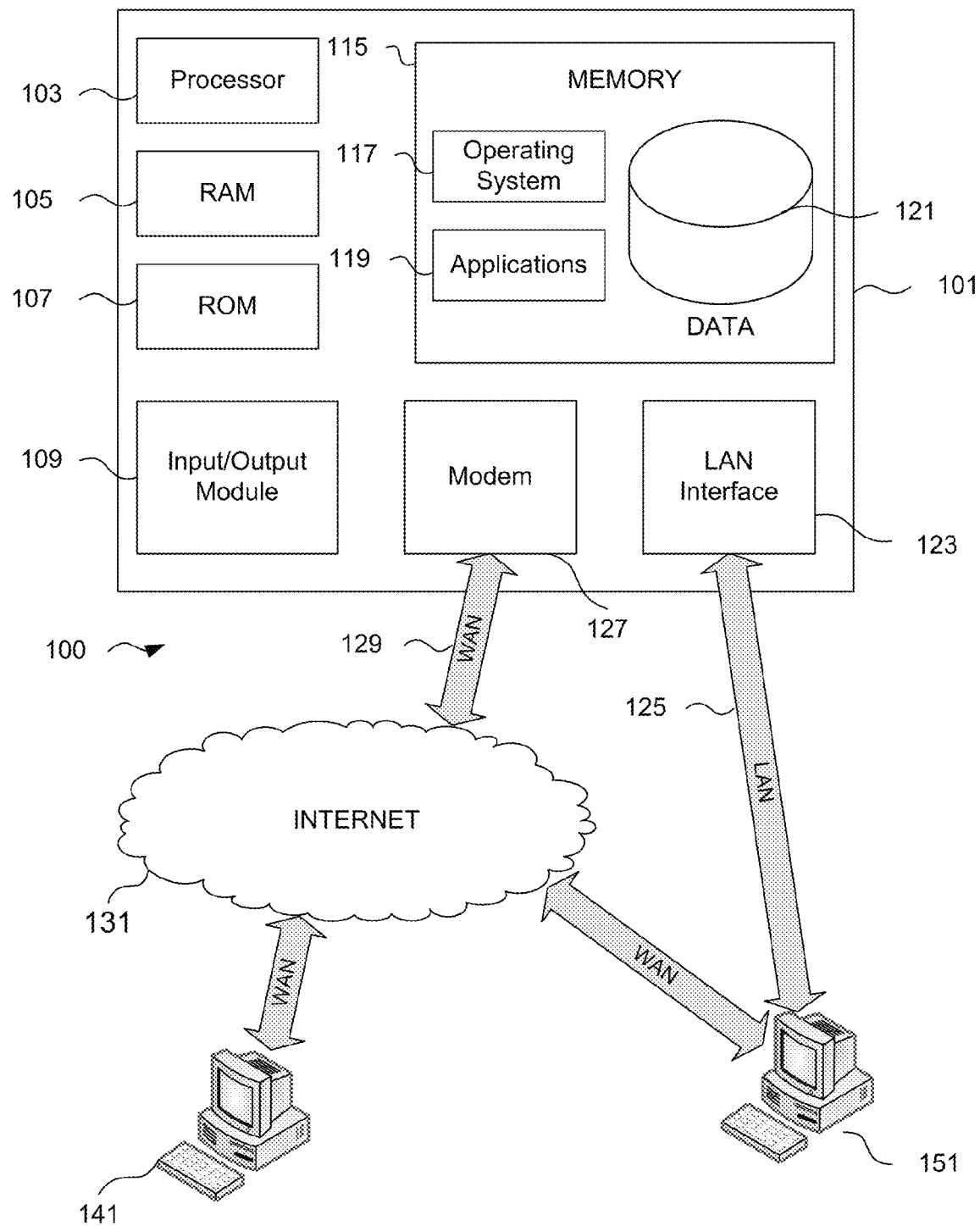
FIG. 1 illustrates a schematic diagram of a general-purpose digital computing environment in which certain aspects described herein may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with individuals, allowing interoperability between different elements of the business residing at different physical locations.

Server 101 may operate in a networked environment 100 supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. Furthermore, any of a number of different communication protocols, such as TCP/IP, Ethernet, FTP, HTTP and the like, may be used within networked environment 100.

Additionally, an application program 119 used by the server 101 according to an illustrative embodiment of the disclosure may include computer executable instructions for invoking functionality related to providing access authorization for facilities and networks.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
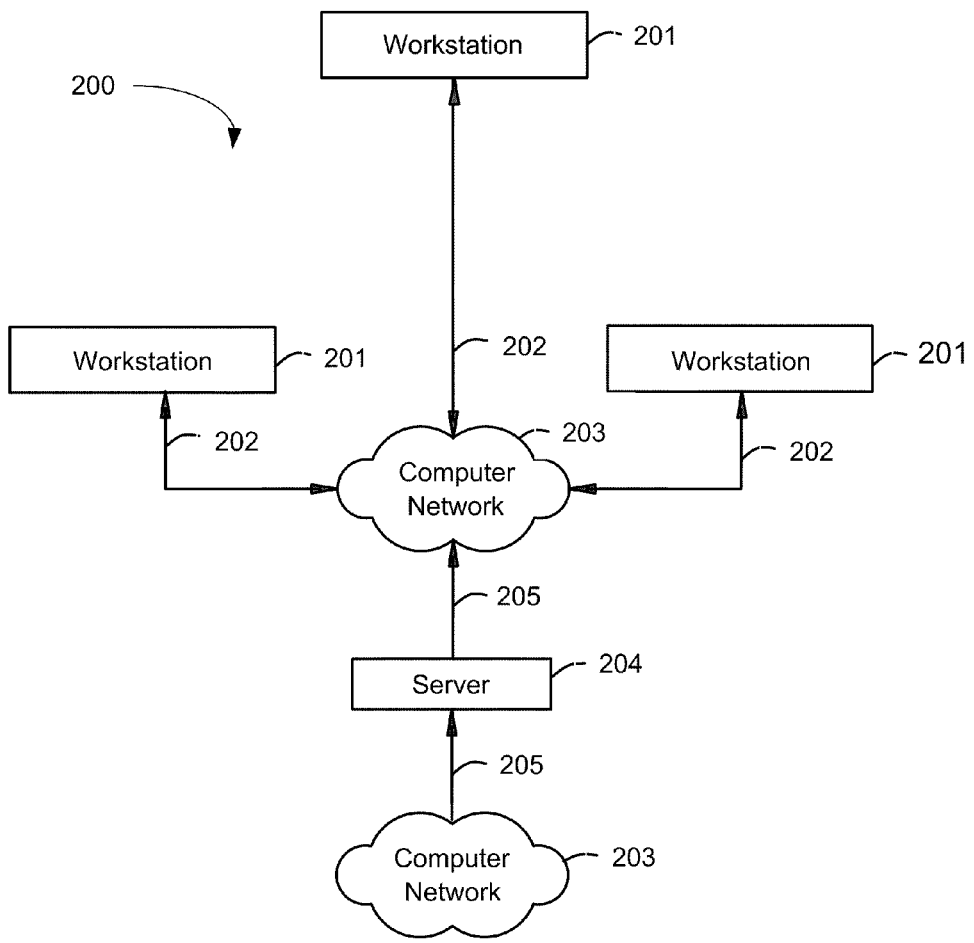
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

The steps that follow in the Figures may be implemented by one or more of the components in FIGS. 1 and 2 and/or other components, including other computing devices.

Figure 3:
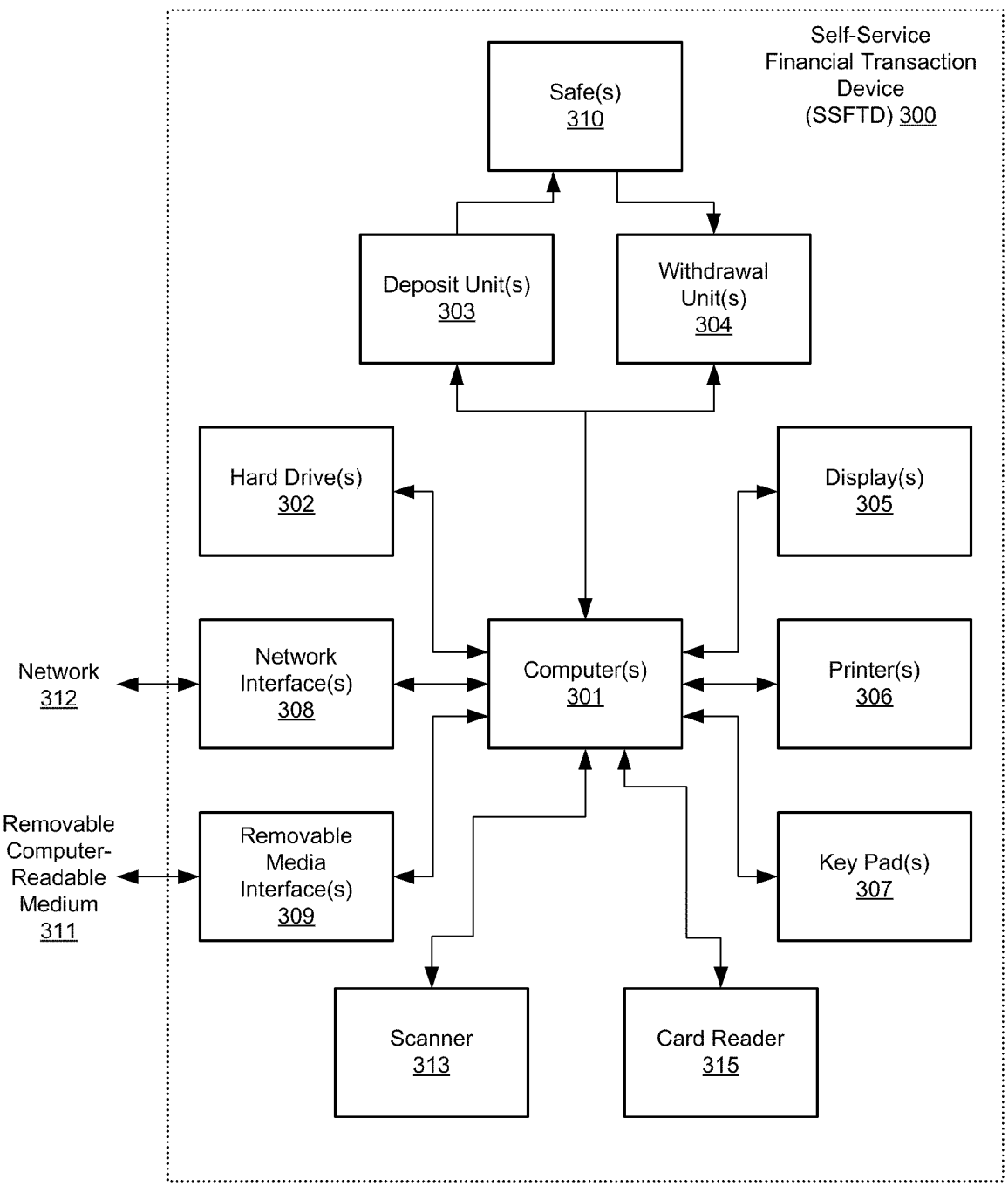
FIG. 3 is an illustrative functional block diagram of a self-service financial transaction device (SSFTD) according to one or more aspects described herein.

FIG. 3 is an illustrative functional block diagram of a self-service financial transaction device (SSFTD) 300. SSFTD 300 may include, for example, an automated teller machine (ATM) or automated kiosk for depositing and/or withdrawing monetary funds, such as checks and cash, checking account balances, receiving cash advances, and performing various other financial transactions. While withdrawals from SSFTD 300 by a user are typically provided to the user as currency, deposits made in SSFTD 300 may be in the form of currency, checks, and other such forms.

As shown in FIG. 3, SSFTD 300 may include a computer 301, a hard drive 302 or other computer-readable medium, a deposit unit 303, a withdrawal unit 304, a display 305, a printer 306, a keypad 307, a network interface 308, a removable media interface 309, a safe 310, a scanner 313, and a card reader 315. Although computer 301 is labeled as a "computer," any one or more of the other functional blocks in FIG. 3 may also be or include a computer. As understood, SSFTD 300 may include one or more computers 301, hard drives 302, deposit units 303, withdrawal units 304, displays 305, printers 306, key pads 307, network interfaces 308, removable media interfaces 309, safes 310, scanners 313, and car readers 315.

The term "computer" as referred to herein broadly refers to any electronic, electro-optical, and/or mechanical device, or system of multiple physically separate or physically joined such devices, that is able to process and manipulate information, such as in the form of data. Non-limiting examples of a computer include one or more personal computers (e.g., desktop or laptop), servers, smart phones, personal digital assistants (PDAs), television set top boxes, and/or a system of these in any combination or subcombination. In addition, a given computer may be physically located completely in one location or may be distributed amongst a plurality of locations (i.e., may implement distributive computing). A computer may be or include a general-purpose computer and/or a dedicated computer configured to perform only certain limited functions.

A computer typically includes hardware that may execute software and/or be configured in hardware to perform specific functions. The software may be stored on a computer-readable medium in the form of computer-readable instructions. A computer may read those computer-readable instructions, and in response perform various steps as defined by those computer-readable instructions. Thus, any functions attributed to any of the functional blocks of FIG. 3 as described herein may be implemented, for example, by reading and executing such computer-readable instructions for performing those functions, and/or by any hardware subsystem (e.g., a processor) from which the computer is composed.

The term "computer-readable medium" as used herein includes not only a single physical medium or single type of medium, but also a combination of one or more physical media and/or types of media. Examples of a computer-readable medium include, but are not limited to, one or more memory chips, hard drives (e.g., hard drive 302), optical discs (such as CDs or DVDs), magnetic discs, and magnetic tape drives. A computer-readable medium may be considered part of a larger device or it may be itself removable from the device. For example, a commonly-used removable computer-readable medium is a universal serial bus (USB) memory stick that interfaces with a USB port of a device.

A computer-readable medium may store computer-readable instructions (e.g., software) and/or computer-readable data (i.e., information that may or may not be executable). In the present example, a computer-readable medium (such as memory) may be included in any one or more of the functional blocks shown in FIG. 3 and may store computer-executable instructions and/or data used by any of those functional blocks. Alternatively or additionally, such a computer-readable medium storing the data and/or software may be physically separate from, yet accessible by, any of the functional blocks shown in FIG. 3.

In an arrangement where SSFTD 300 is an ATM, computer 301 may be embodied as a personal computer and may be responsible for the overall control of SSFTD 300. To perform such control, computer 301 may execute, for example, one or more software applications, one or more device control programs, and one or more operating systems, each of which may be stored on hard drive 302, which may be a single physical hard drive or multiple physical hard drives. These various elements will be discussed in further detail below.

Hard drive 302 may be a single physical hard drive unit or may include multiple physical hard drive units. Rather than, or in addition to, hard drive 302, SSFTD 300 may store data and/or computer-executable instructions on one or more other types of computer-readable medium, such as an optical disc drive, a magnetic tape drive, and/or memory chips.

Deposit unit 303 may be responsible for physically receiving deposited items such as currency and checks, for physically counting the deposited items, for physically holding the deposited items in an escrow area during a deposit transaction, for calculating the value of the deposited items, and for physically transferring the deposited items to safe 310 when the transaction is complete.

Withdrawal unit 304 may be responsible for physically retrieving currency or other items from safe 310 during a withdrawal transaction, and for physically providing the retrieved currency to the user.

Display 305 may be responsible for displaying a visual user interface to the user, and may also incorporate a touch screen capability for receiving user input. Typical information that may be presented on display 305 includes text and/or graphics representing the status of a transaction. Likewise, printer 306 may be responsible for presenting a paper printout containing information about a transaction.

Key pad 307 may include one or more buttons, switches, and/or other physical user input elements, and may be responsible for receiving user input associated with a transaction. For example, key pad 307 may include digit keys zero through nine and other function keys. Card reader 315 may be any type of device that reads data from a card, such as the magnetic strip on magnetic cards such as ATM/bank cards.

Network interface 308 may be responsible for data communication between SSFTD 300 and a network 312. The communication may be uni-directional or bi-directional. Network 312 may be a single network or combination of multiple coupled networks, and may be wireless and/or wired. Examples of network 312, or portions thereof, include the Internet, a wired or wireless local area network, a satellite communication network, and various other data or communication networks.

Removable media interface 309 may be responsible for reading from and/or writing to a removable computer-readable medium 311, such as a USB key, a compact disc (CD), a floppy magnetic disc, or a portable hard drive. Removable media interface 309 may therefore include a physical port for plugging in or otherwise temporarily receiving removable computer-readable medium 311. This port may be physically part of, for instance, the housing of computer 301. However, the port may be located elsewhere in or on SSFTD 300, such as on a rear housing of SSFTD 300 that may be accessible by maintenance servicers of SSFTD 300 but not necessarily to the general public. Regardless of the location of the port, data read from removable computer-readable medium 311 by removable media interface 309 may be provided to computer 301, and data provided by computer 301 may be written by removable media interface 109 to computer-readable medium 311.

Scanner 313 may include, for instance, a camera that is able to take a digital photograph of a check to produce one or more images representing the front and/or back of the check. In addition to generating an image of the check, scanner 313 may be further capable of reading magnetically printed information on the check, such as magnetic ink that is typically printed on a check, and performing magnetic ink character recognition (MICR). Such MICR processes are well known. The data produced by performing MICR that represents the recognized magnetic ink characters is referred to herein as MICR data. Scanner 313 further may be configured to perform optical character recognition (OCR) on a check, which involves the translation of optically scanned text or written information on the check into machine-encoded text that can be read by scanner 313.

Figure 4:
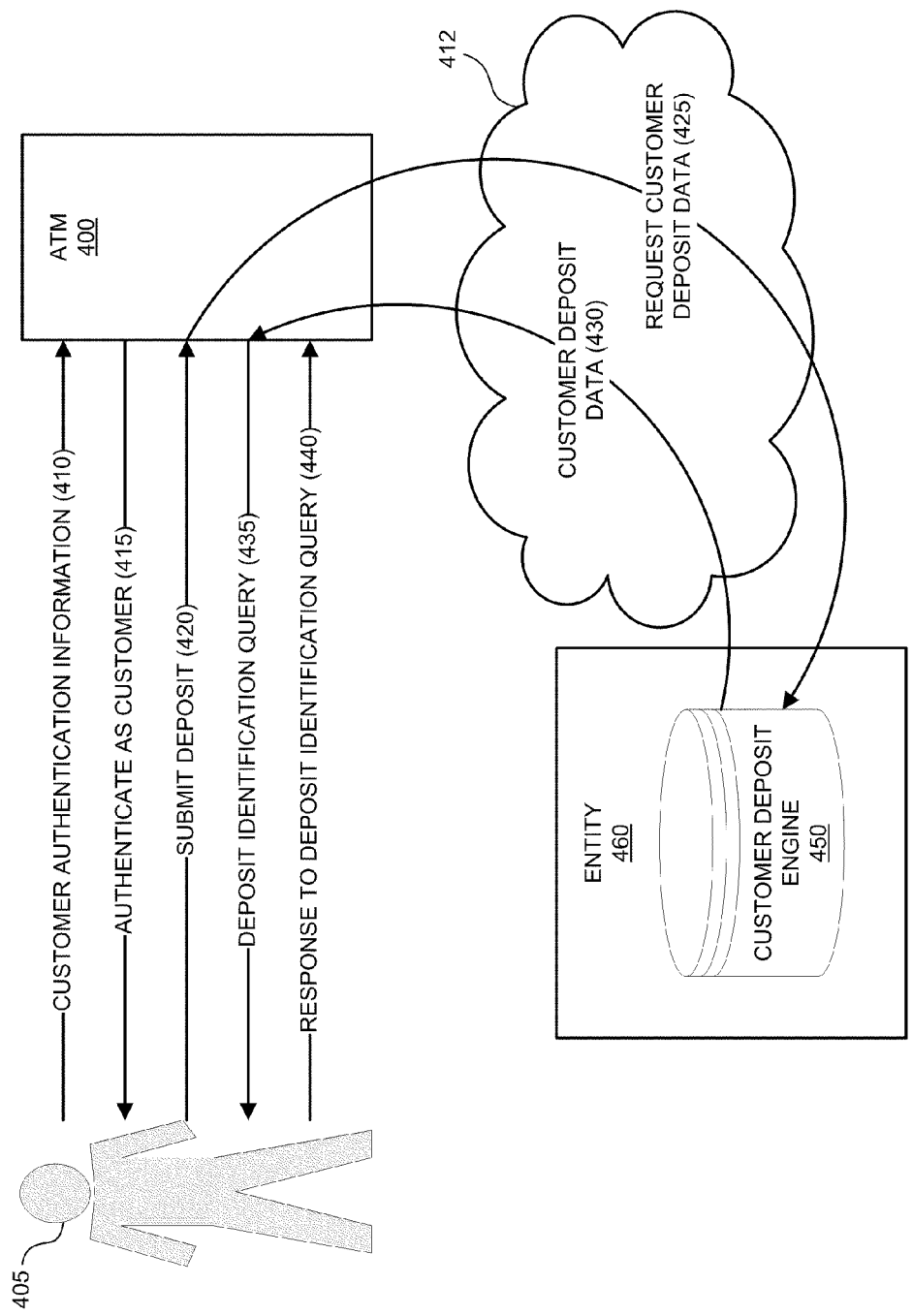
FIG. 4 is an illustrative data flow diagram of check deposit recognition system according to one or more aspects described herein.

FIG. 4 is an illustrative block diagram of a system for recognizing a check deposit made by a customer 405 at a self-service financial transaction device (SSFTD), such as ATM 400, according to one or more aspects described herein. FIG. 4 illustrates a system for using stored customer transaction deposit data, which may be maintained in a customer deposit database 450 of, for example, entity 460 with which customer 405 is associated, to identify a check that is unable to be recognized by ATM 400 upon initial deposit.

A customer 405, who may be an account owner of entity 460, which may be, for example a financial institution, may access ATM 400 to deposit a check into the account belonging to customer 405. ATM 400 may also be connected to one or more entities, such as entity 460, though a network 412. Network 412 may include one or more privately accessible networks, or a combination of privately and publicly accessible networks. In addition, network 412 may include wired, wireless, or a combination of both technologies for implementation. Network 412 may include intranets and/or the Internet.

Entity 460 may be a financial institution that owns and/or operates ATM 400 for distribution of information and/or monetary funds to an individual and/or to receive information and/or monetary funds from an individual. Customer 405 may access a corresponding account of the customer 405 that the customer 405 has with entity 460 by utilizing ATM 400. After some form of authentication information 410 is passed from the customer 405 to the ATM 400, and the ATM 400 authenticates 415 the user as customer 405, then the customer 405 may deposit monetary funds 420, such as a check, into the account associated with an entity. In one arrangement, the form of authentication information 410 passed from the customer 405 to the ATM 400 may include a card (e.g., ATM card, check card, credit card, and the like) linked to one or more accounts of the customer 405 in addition to a personal identification number (PIN) authenticating the customer 405.

In the example illustrated in FIG. 4, entity 460 may own and/or operate ATM 400 to receive information and/or monetary funds 420 for deposit from customer 405. As shown, ATM 400 may receive a deposit 420 from customer 405 and then communicate a request for customer deposit data 425 to customer deposit database 450 of entity 460 via network 412. As will be described in greater detail herein, ATM 400 may send the request for customer deposit data 425 to identify one or more characteristics associated with the submitted deposit 420. The request for customer deposit data 425 may be a request for data specific to customer 405, such as data related to other deposits similar to submitted deposit 420 made by customer 405, or may be a request based on information at least partially identified from the submitted deposit 420 e.g., based on magnetic ink recognized data, payor name, date, and the like. In at least one arrangement, ATM 400 may send request for customer deposit data 425 to customer deposit database 450 when ATM 400 is unable to determine an amount of submitted deposit 420 based on a scanned image of submitted deposit 420. Customer deposit database 450 may similarly transmit customer deposit data 430 to ATM 400 via network 412. In some arrangements, customer deposit database 450 may transmit customer deposit data 430 to ATM 400 in response to receiving a request for such customer deposit data 425 from ATM 400, while in other arrangements, customer deposit database 450 may transmit customer deposit data 430 to ATM 400 automatically upon identifying customer 405 as being a customer for which customer deposit data 430 is stored within customer deposit database 450. Additionally, in some arrangements, customer deposit database 450 may also include, or alternatively be, a server or engine configured to process requests received from ATM 400 regarding customer deposit data and transmit back to ATM 400 results of such processed requests.

As further shown in FIG. 4, ATM 400 may use customer deposit data 430 received from customer deposit database 450 to send a deposit identification query 435 to customer 405, to which customer 405 may send back a response 440. In at least one arrangement, ATM 400 may send deposit identification query 435 to customer 405 by displaying the query on a display (e.g., display 305 shown in FIG. 3) of ATM 400. In other arrangements, ATM 400 may send deposit identification query 435 to customer 405 in an audible manner by way of a speaker or other similar device included as part of ATM 400. Additionally, the response 440 to the deposit identification query from customer 405 may be transmitted to ATM 400 in multiple different ways, including a touch screen incorporated into a display of ATM 400, a bi-directional speaker or sound receiving device, and the like.

It should be understood that more than one SSFTD associated with entity 460, such as ATM 400, may be in communication with and have access to customer deposit database 450. For example, one customer deposit database 450 may serve all of the ATMs 400 owned and/or operated by entity 460 within a particular geographic region, while another customer deposit database 450 serves all of the ATMs 400 owned and/or operated by entity 460 in a different geographic region. Similarly, in one or more arrangements, ATM 400 may have access to numerous customer deposit databases in addition to customer deposit database 450. For example, depending on the type of customer (corporate, personal, and the like) and/or type of account(s) (checking, savings, money market, and the like) that customer 405 is authenticated as being associated with, ATM 400 may utilize more than one customer deposit database 450 of entity 460.

Figure 8:
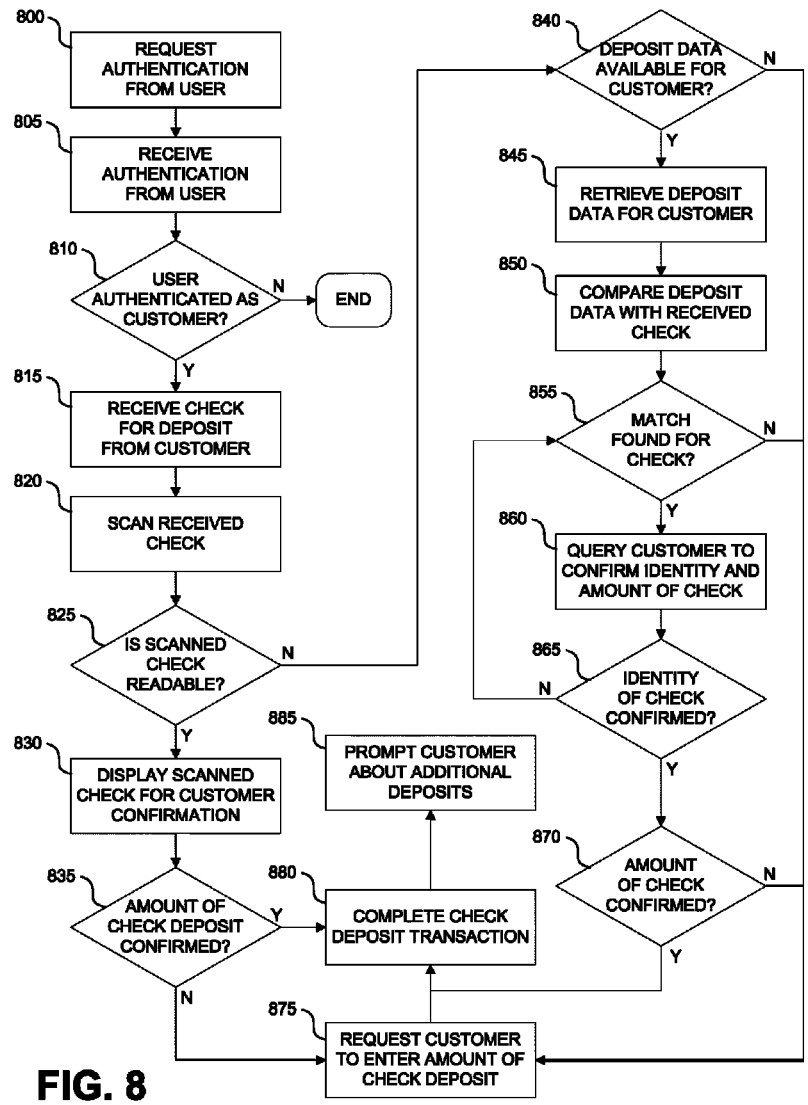
FIG. 8 is a flowchart illustrating an example method for check deposit recognition according to one or more aspects of the present disclosure.

FIG. 8 illustrates an example process of check deposit recognition that may be implemented by a SSFTD, such as an ATM (e.g., ATM 400 shown in FIG. 4), according to various aspects described herein. The process begins at step 800 with the ATM requesting authentication from a user of the ATM. The authentication requested in step 800 is to authenticate the user as a customer of the financial institution associated with the ATM. The authentication request may include, for example, requiring the user to enter a personal identification number (PIN) associated with a card (e.g., ATM/bank cards) submitted to the ATM by the user and/or requiring the user to respond to one or more personal identification questions. Other similar types of authentication requests may also be used in addition to or instead of those described. In step 805, the ATM receives authentication input from the user, which is used in step 810 to determine whether the user is authenticated as a customer of the financial institution associated with the ATM. If, at step 810, the user is not authenticated as a customer of the institution, then the process ends. If instead the user is authenticated as a customer of the institution in step 810, then the process continues to step 815 where the ATM receives a check for deposit from the customer. For example, in step 815, the ATM may physically receive the check from the user via a deposit unit (e.g., deposit unit 303 shown in FIG. 3), which may receive the check and pass the check along to a scanner (e.g., scanner 313 shown in FIG. 3) to generate a scanned image of the check and perform character recognition (e.g., optical character recognition, magnetic ink character recognition, and the like) on the check in step 820.

In step 820, the ATM may scan the received check to create an image of the check and also conduct a character recognition process on the check to read certain information printed on the check, such as the payor, check amount, date, and the like. In at least one arrangement, the character recognition performed by the scanner may include magnetic ink character recognition (MICR), where the ATM reads magnetically printed information on the check, and/or optical character recognition (OCR), which involves the translation of optically scanned text or written information on the check into machine-encoded text that can be read by the scanner. After the check is scanned in step 820, the ATM determines in step 825 whether the scanned check is wholly or partially readable (e.g., whether the scanner was able to perform character recognition on the scanned check to read one or more pieces of information printed or written on the check).

If the scanned check is readable in step 825, then the process continues to step 830 where the ATM displays the scanned image of the check to the customer for confirmation of the amount of the check deposit. For example, the scanned image of the check may be displayed to the customer on a display of the ATM (e.g., display 305 shown in FIG. 3) that is capable of displaying a visual user interface to the customer. In one arrangement, the ATM may display an image of the scanned check with the printed amount of the check visible to the customer, along with a query requesting the customer to confirm the amount for deposit. In step 835 the ATM determines whether the customer confirms the amount of the check deposit, for example, by receiving a positive response to a query about the amount of the scanned check displayed in step 830. If, in step 835, the ATM determines that the amount of the check deposit has been confirmed by the customer, then in step 880 the ATM completes the check deposit transaction. However, if in step 835 the customer does not confirm the amount of the check deposit, then the process goes to step 875, where the ATM requests the customer to enter the amount of the check deposit. Once the ATM receives the entered amount of the check deposit in step 875, then the process again continues to step 880 with the ATM completing the deposit transaction.

Referring back to step 825, if the scanned image of the check is found to be wholly or partially unreadable, then the process may proceed to step 840 where the ATM determines if deposit data is available for the customer. In one arrangement, the process illustrated may continue to step 840 only upon a determination in step 825 that certain items of information printed or written on the check, such as the amount of the check and/or the payor, cannot be read from the scanned image. In other arrangements, the process may continue to step 840 if any portion or items of information printed on the check cannot be read from the scanned image.

In at least some arrangements, determining whether deposit data is available for the customer in step 840 may depend on the particular capabilities of the ATM involved and/or certain criteria specified by the entity that owns and/or operates the ATM. For example, an ATM located in a highly-populated area, which is therefore used on a frequent basis, may have different deposit data collection capabilities than an ATM in a more remote location that is used less frequently. Furthermore, an entity that owns and/or operates numerous ATMs in many different locations may determine that certain ATMs repeatedly receive identical deposits from the same customer(s) more often than do other ATMs owned and/or operated by the entity. Accordingly, in some arrangements, the entity may specify certain threshold amounts of deposit data that must be collected for a particular customer before such data is made available in step 840 of the process illustrated in FIG. 8. For example, as will be further described below, before a customer is queried by an ATM about the identity of a particular deposit, the entity associated with the ATM may require that deposit data have been collected for that customer on at least ten different occasions within a certain time period (e.g., two months) or consistently-spaced apart (e.g., every two weeks).

In any of the different arrangements described above with regard to the availability of deposit data for customers, if at step 840 it is determined that no such deposit data is available for the customer, then the process continues to step 875 where the customer is requested to enter the amount of the check deposit. However, if deposit data is found to be available for the customer in step 840, then in step 845 the ATM retrieves the deposit data from a customer deposit database (e.g., customer deposit database 450 shown in FIG. 4) of the entity, and compares the deposit data with the received check in step 850. While in some arrangements, deposit data retrieved for the customer in step 845 may be limited only to data relevant to the portions of the received check that were unreadable in step 825, in other arrangements all deposit data for the customer is retrieved in step 845. Deposit data retrieved for the customer in step 845 may include various data about previous deposits made by the customer, including when the deposits were made (e.g., time of day, day of week, day of month, and the like), the locations (e.g., specific ATMs) at which the deposits were made, the amounts of the deposits, the payors associated with the deposits and other relevant information. One example of deposit data retrieved for the customer may be interpreted through queries or fuzzy logic to conclude that every Friday afternoon around four o'clock, the customer deposits a check from employer "X" in the amount of five-hundred dollars. Another example or query of deposit data may indicate that on the fourteenth day of every month, the customer deposits a check in the amount of two-hundred dollars at the ATM located at the intersection of street "A" and street "Z." Numerous other types of information related to previous deposits made by the customer may be collected and stored for retrieval in step 845 in addition to or instead of the types described above.

If deposit data is retrieved for the customer in step 845, then in step 850 the retrieved deposit data is compared to the received check. More specifically, the retrieved deposit data, or conclusions drawn from the retrieved deposit data, is compared to data associated with the received check deposit which, in at least one arrangement, is collected according to a set of factors determined by the entity that owns and/or operates the ATM. For example, the ATM may compare the deposit data retrieved for the customer to the time, day, location, and the like associated with the received check to determine whether the received check resembles a deposit that the customer has made on one or more previous occasions. In another example, the ATM may also or alternatively compare the deposit data retrieved for the customer to partially scanned data associated with the received check. In step 855 the ATM determines, based on the comparison in step 850, whether there is a match between the received check and a previous deposit made by the customer. In one arrangement, identifying a match for the received check may require that all of the data associated with the received check be substantially similar to corresponding portions of the retrieved deposit data for the customer. In another arrangement a match may be found as long as a certain threshold amount of the data associated with the received check is substantially similar to the retrieved deposit data. The determination as to whether a match is found for the received check may depend on certain criteria set forth by the entity that owns and/or operates the ATM, and vary according to certain characteristics of the ATM, such as frequency of use, geographic location, and the like.

If a match is not found for the received check in step 855, then the process proceeds to step 875 where the customer is requested to enter the amount of the check deposit. However, if a match is found in step 855, then in step 860 the customer may be queried about the identity of the received check, and specifically the amount of the received check. FIGS. 5A through 5D illustrate example user interfaces that may be utilized by the ATM to query the customer about the identity of the received check. The user interfaces illustrated in FIGS. 5A through 5D may be displayed on a display of the SSFTD (e.g., display 305 shown in FIG. 3). Each of user interfaces 500A, 500B and 500C shown in FIGS. 5A, 5B and 5C, respectively, include a query to the customer about the identity of the check that the customer just submitted. For example, user interface 500A includes query 501, which (although stated differently in FIG. 5A) asks whether the check just submitted is substantively the same check that the customer deposits every "X" number of weeks (where "X" might be, for example, one, two, three, and the like) issued by a certain payor for a specific amount. User interfaces 500B and 500C each include a different variation of query 501. For example, whereas query 501 focuses on how frequently the customer deposits a check, query 503 shown in user interface 500B is directed towards how frequently the check is issued to the customer (e.g., the date of the check). Additionally, query 505 shown in user interface 500C is based on the particular day of the month that the customer submits checks for deposit, such as the fifteenth day of every month. It should be understood that queries 501, 503 and 505 are only three examples of the many different types of queries that may be presented to the customer in step 860 of FIG. 8, and such queries may be worded in numerous other ways in addition to or instead of those illustrated.

Figure 5A:
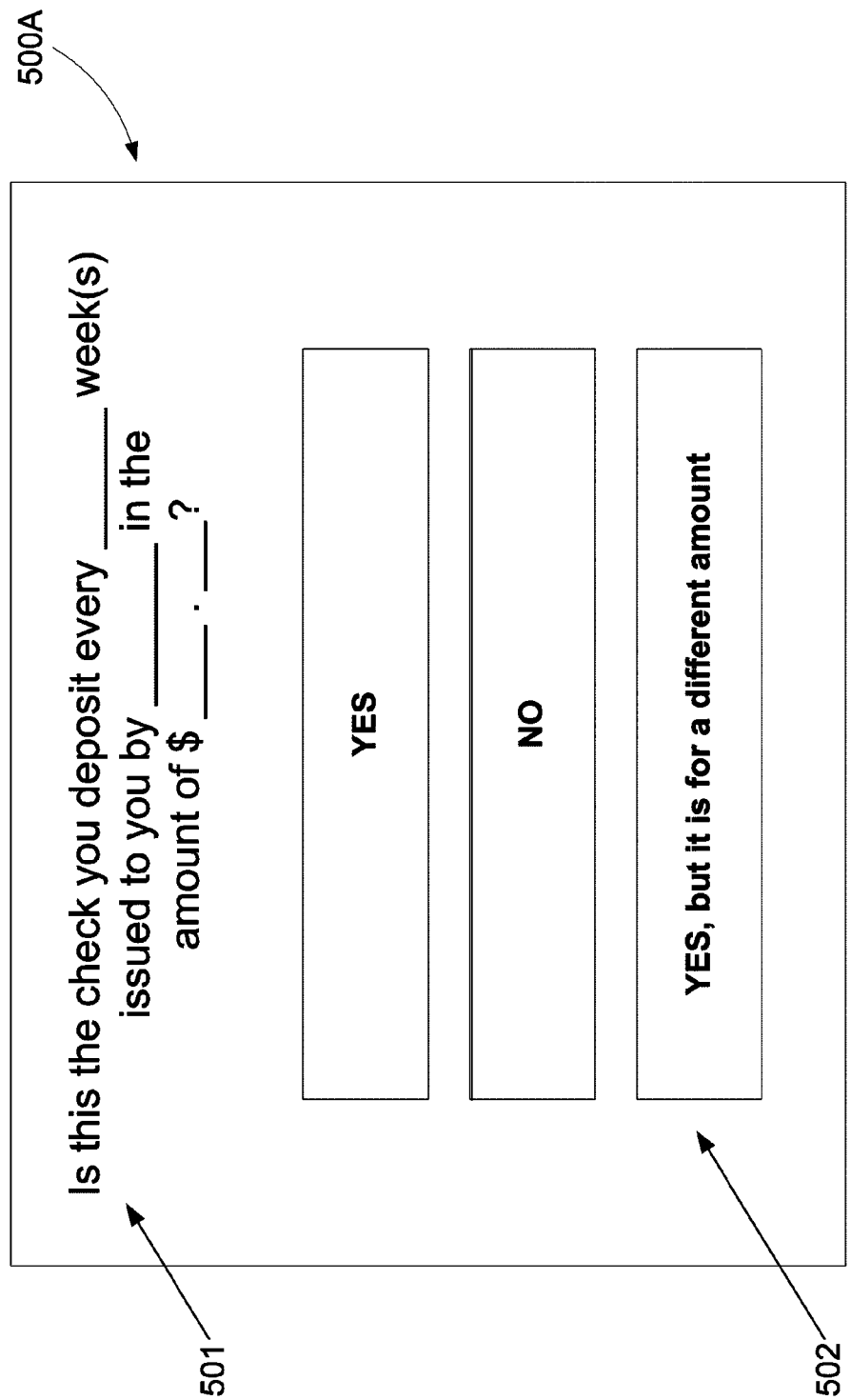
FIG. 5A is an illustrative user interface for confirming an identify of a check deposit according to one or more aspects described herein.
Figure 5C:
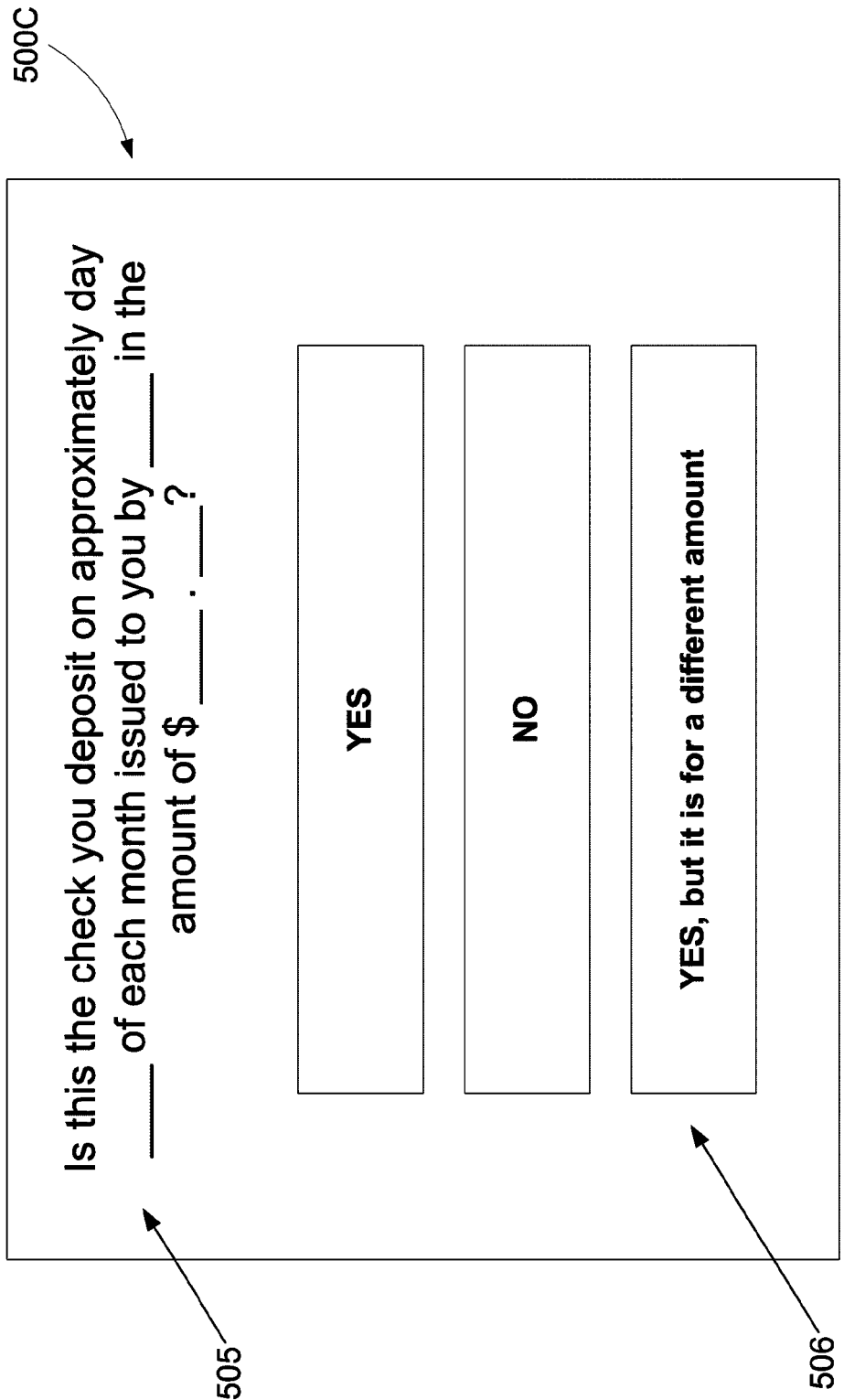
FIG. 5C is an illustrative user interface for confirming an identify of a check deposit according to one or more aspects described herein.

As shown in FIGS. 5A, 5B and 5C, in addition to the user interfaces 500A, 500B and 500C including "YES" and "NO" responses to the respective query presented therein, the user interfaces may also include responses 502, 504 and 506, which indicate that the query correctly identifies the check submitted for deposit by the customer in all respects other than the amount of the check. For example, referring to FIG. 5A, the customer may be asked after submitting a check for deposit, "Is this the check you deposit every two week(s) issued to you by Employer Y in the amount of $200.00?" If the check is in fact issued by Employer Y and the customer usually deposits the check every two weeks, but for one reason or another the check is in the amount of $250.00, then the customer may select response 502.

Figure 6:
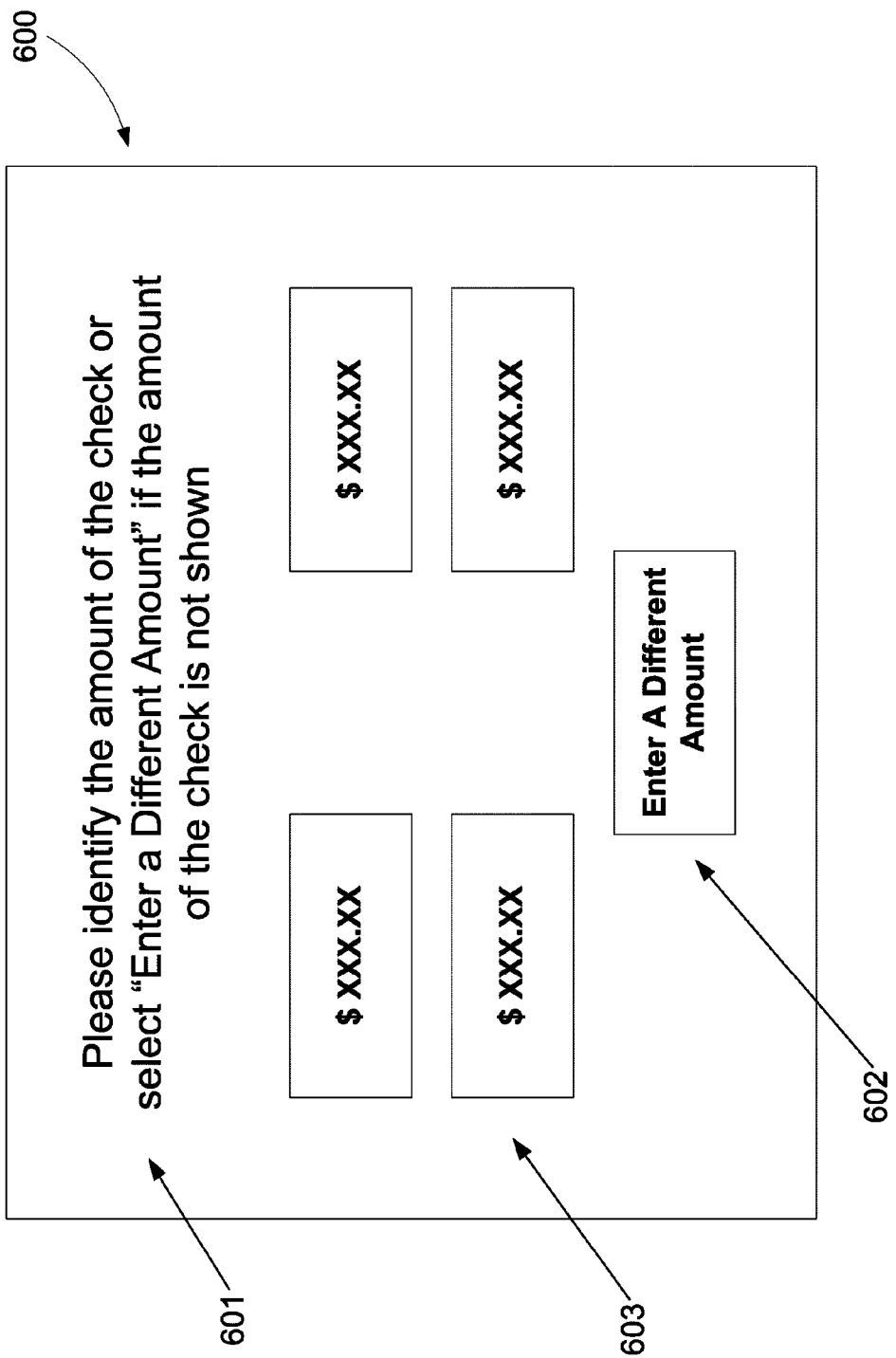
FIG. 6 is an illustrative user interface for identifying and confirming an amount of a check deposit according to one or more aspects described herein.

In at least some arrangements, upon receiving a customer selection of any of responses 502, 504 and 506 indicating that the check is the one identified in the query (e.g., query 501, 503 or 505), but that the amount of the check is different, the ATM may display user interface 600 shown in FIG. 6. As illustrated, user interface 600 includes instruction 601 that instructs the customer to identify the amount of the check or, if the amount of the check is not one of the amounts shown in user interface 600, then to select the "Enter a Different Amount" option 602. Customers may regularly deposit checks issued by the same payor where the checks alternate between two, three, or several different amounts. For example, every two weeks a customer may deposit a check issued by payor "XYZ" in one of three different amounts, $300.00, $250.00 or $200.00. Over a period of sixteen weeks, the check deposits made every two weeks by the customer may be the following:

Week 2: $300.00
Week 4: $200.00
Week 6: $250.00
Week 8: $300.00
Week 10: $200.00
Week 12: $250.00
Week 14: $300.00
Week 16: $200.00

If the customer submits a check in week 18 that is determined to be issued by payor "XYZ," but the amount of the check cannot be read from a scanned image of the check (e.g., "NO" in step 825 of FIG. 8), then a comparison of the deposit data retrieved for the customer (which for purposes of this example would include the data outlined above for the first sixteen weeks) with the check submitted may result in the customer being presented with a query similar to query 501 shown in FIG. 5A, such as "Is this the check you deposit every two weeks issued to you by payor "XZY" in the amount of $250.00?" However, if for some reason the check is not in the amount of $250.00, then the customer, upon being presented with a user interface similar to user interface 500A, may select response 502 indicating that the check is from payor "XYZ" and that the customer normally deposits such checks from payor "XYZ" every two weeks, but it is not for the queried amount. In such an example, the ATM may present the customer with a user interface similar to user interface 600 including in area 603 the different amounts of previously deposited checks issued to the customer by payor "XYZ" (e.g., $300.00 and $200.00).

In some arrangements, the ATM may query the customer in step 860 of FIG. 8 by utilizing user interface 500D shown in FIG. 5D. As illustrated, user interface 500D includes query 507, which asks the customer whether the check submitted is one of several deposits that the customer makes together on some regular basis (e.g., every three weeks, every Tuesday, every June, and the like). For example, the customer may be queried about whether the check submitted is one of the checks listed in area 508 of user interface 500D. If so, then query 507 further instructs the customer to identify the check submitted (e.g., by activating the "Select" button or icon next to the appropriate check). Additionally, user interface 500D may also include response 509 indicating that the check submitted by the customer is not one of the customer's usual deposits listed in area 508. In at least one arrangement, upon receiving a selection of response 509 from the customer, the ATM may proceed to request the customer to enter an amount of the check deposit, as in step 875 of the process illustrated in FIG. 8.

In other arrangements, user interface 500D may further include the "New Amount" option area 510 where the check submitted by the customer is one of the customer's usual deposits listed in area 508, but the amount is different than what is displayed as the usual amount of the check. Upon receiving a selection of the "New Amount" option from the customer, the ATM may request the customer to enter an amount of the check similar to step 875.

Referring back to FIG. 8, once the customer is queried as to the identity and amount of the check deposit in step 860, the process continues to step 865 where the ATM determines, based on the customer's response to the query (e.g., "YES," "NO," responses 502, 504, 506, 509, and the like), whether the identity of the check is confirmed. If the identity is not confirmed in step 865 then, in at least some arrangements, the process reverts back to step 855 where the ATM determines, based on the comparison in step 850, whether there is another match between the received check and a previous deposit made by the customer. In other words, steps 855, 860 and 865 may occur as an iterative process in which the ATM presents the customer with a first match for the received check and if that is not confirmed as the identity of the check, presents the customer with a second match if one is found in step 855, and so on. For example, if, in step 860 the customer is presented with a user interface similar to user interface 500A illustrated in FIG. 5A, and the customer selects "NO" in response to query 501, then the ATM may display another user interface similar to user interface 500A, but with a different check identity included as part of query 501.

If the identity of the received check is confirmed in step 865, then the process moves to step 870 where the ATM determines whether the amount of the identified check is confirmed by the customer. As described above with respect to FIGS. 5A through 5D, the query presented to the customer in step 860 may correctly identify the received check in terms of the frequency or timing of the deposit, as well as the payor issuing the check, yet identify an amount of the check that is different from what is actually being deposited by the customer. As shown in FIGS. 5A through 5D, the amount of the identified check may be confirmed in direct response to the query presented to the customer in step 860 (e.g., a "YES" response to any of queries 501, 503, 505, and the like). If the amount of the identified check is not confirmed in such a manner, then the amount may alternatively be confirmed by the customer when presented with, for example, user interface 600. Similarly, if the ATM determines in step 870 that the amount of the check is not confirmed by the customer, then the process may proceed to step 875 where the customer may be requested to enter an amount of the check. In at least one arrangement, such a request may be made upon receiving a selection of the "Enter a Different Amount" option 602 shown in FIG. 6. Once the amount of the check is confirmed in step 870 or entered by the customer in step 875, the process continues to step 880 where the ATM completes the deposit transaction.

Figure 7:
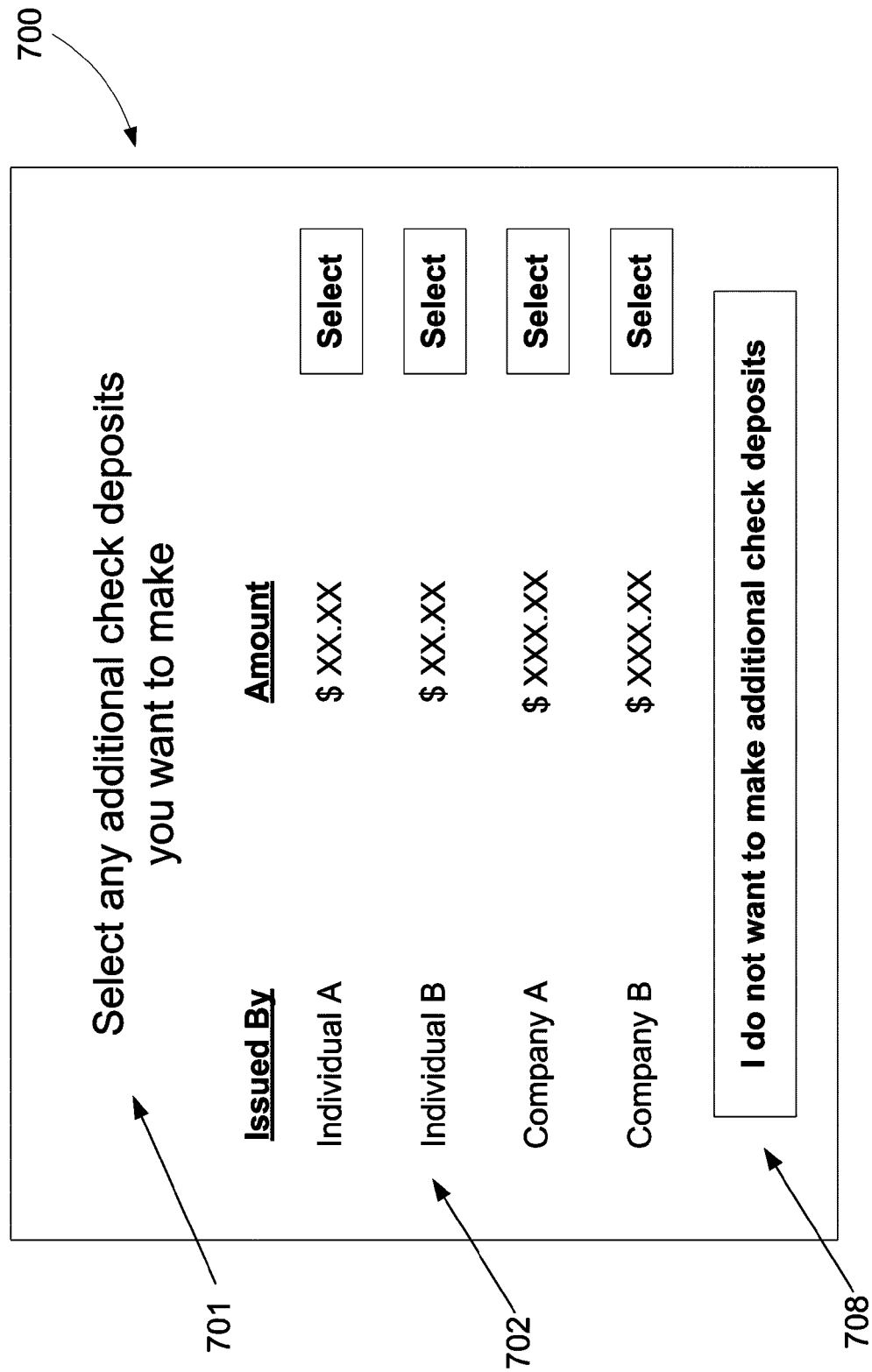
FIG. 7 is an illustrative user interface for making additional check deposits according to one or more aspects described herein.

In one or more arrangements, process illustrated in FIG. 8 proceeds from the ATM completing the deposit transaction in step 880 to the ATM prompting the customer in step 885 about additional deposits that the customer may want to make. User interface 700 shown in FIG. 7 is an example of a user interface that may be utilized by the ATM in step 885. As shown, user interface 700 may include prompt 701 that asks the customer to select any additional check deposits listed in area 702 that the customer wants to make. If the customer does not wish to make any additional check deposits, then the customer may select response 708 indicating such. However, because the ATM retrieved deposit data for the customer in step 845, the ATM may determine that in addition to the particular check deposit that was just completed in step 880, the customer usually makes one or more other check deposits as well. Accordingly, in step 885 the ATM may display to the customer a user interface similar to user interface 700 to allow the customer the opportunity to select additional deposits that the customer may want to make at the time.

Although specific examples of carrying out the aspects of the disclosure have been described, those skilled in the art will appreciate that there are numerous variations and permutations of the above-described systems and methods that are contained within the spirit and scope of the disclosure as set forth in the appended claims. Additionally, numerous other embodiments, modifications and variations within the scope and spirit of the appended claims will occur to persons of ordinary skill in the art from a review of this disclosure.

We claim:

1. A method comprising:
receiving, at a self-service financial transaction device, a check for deposit from a user; creating, by the self-service financial transaction device, a scanned image of the check; determining, by the self-service financial transaction device, that an amount of the check cannot be read from the scanned image of the check;
querying, by the self-service financial transaction device, the user about the amount of the check received for deposit in relation to an amount of one or more previous check deposits made by the user and whether the amount of the check received for deposit equals the amount of the one or more previous check deposits made the user; receiving, by the self-service financial transaction device, one or more responses to the querying from the user; and determining, by the self-service financial transaction device, the amount of the check based on the one or more responses received from the user.

2. The method of claim 1, further comprising:
recording, by the self-service financial transaction device, transaction data associated with the received check deposit from the user;
responsive to determining, by the self-service financial transaction device, that the amount of the check cannot be read from the scanned image of the check, retrieving, by the self-service financial transaction device, transaction data associated with previous check deposits made by the user; and comparing, by the self-service financial transaction device, the transaction data associated with the received check deposit with the retrieved transaction data associated with previous check deposits made by the user.

3. The method of claim 1, further comprising:
recording, by the self-service financial transaction device, transaction data associated with the received check deposit from the user; transmitting, by the self-service financial transaction device, the recorded transaction data associated with the received check deposit to a user deposit database; responsive to determining, by the self-service financial transaction device, that the amount of the check cannot be read from the scanned image of the check, the self-service financial transaction device querying the user deposit database for a comparison of the transmitted transaction data associated with the received check deposit with transaction data associated with previous check deposits made by the user; and receiving, at the self-service financial transaction device, a result of the comparison from the user deposit database, wherein the querying the user about the amount of the check received for deposit in relation to the amount of the one or more previous check deposits is based on the received result of the comparison.

4. The method of claim 1, wherein the self-service financial transaction device is an automated teller machine (ATM).

5. The method of claim 2, wherein the querying the user about the amount of the check received for deposit in relation to the amount of the one or more previous check deposits made by the user includes: identifying, by the self-service financial transaction device, a previous check deposit made by the user that has one or more similar characteristics to the received check deposit based on the comparing of the transaction data associated with the received check deposit with the transaction data associated with previous check deposits; querying, by the self-service financial transaction device, the user about whether the received check deposit has one or more similar characteristics to the previous check deposit; and responsive to receiving a confirmation from the user that the received check deposit has the one or more similar characteristics to the previous check deposit, the self-service financial transaction device determining the amount of the received check deposit based on an amount of the previous check deposit.

6. The method of claim 5, further comprising:
responsive to receiving a denial from the user that the received check deposit has the one or more similar characteristics to the previous check deposit, the self-service financial transaction device identifying a next previous check deposit made by the user that has one or more similar characteristics to the received check deposit based on the comparing of the transaction data associated with the received check deposit with the transaction data associated with previous check deposits, wherein the next previous check deposit is different from the previous check deposit; and querying, by the self-service financial transaction device, the user about whether the received check deposit has one or more similar characteristics to the next previous check deposit.

7. The method of claim 1, further comprising:
outputting to a display associated with the self-service financial transaction device the scanned image of the check; and requesting, by the self-service financial transaction device, a confirmation from the user of the amount of the check based on the scanned image.

8. The method of claim 2, wherein the transaction data associated with the received check deposit from the user includes one or more of a location of the self-service financial transaction device, a date of the receiving of the check deposit, a time of day of the receiving of the check deposit, a payor identified on the check deposit, and a date identified on the check deposit.

9. One or more non-transitory computer-readable media storing computer-readable instructions that, when executed by at least one computer, cause the at least one computer to perform a method of: receiving a check for deposit from a user; scanning the check to create a scanned image of the check; determining that an amount of the check cannot be read from the scanned image of the check; querying the user about the amount of the check received for deposit in relation to an amount of one or more previous check deposits made by the user and whether the amount of the check received for deposit equals the amount of the one or more previous check deposits made the user; receiving a response to the query from the user; and determining the amount of the check based on the response received from the user.

10. The one or more non-transitory computer-readable media of claim 9, the computer-readable instructions that, when executed by at least one computer, further cause the at least one computer to perform: recording transaction data associated with the received check deposit from the user; responsive to determining that the amount of the check cannot be read from the scanned image of the check, retrieving transaction data associated with previous check deposits made by the user; and comparing the transaction data associated with the received check deposit with the retrieved transaction data associated with previous check deposits made by the user.

11. The one or more non-transitory computer-readable media of claim 9, the computer-readable instructions that, when executed by at least one computer, further cause the at least one computer to perform: recording transaction data associated with the received check deposit from the user; transmitting the recorded transaction data associated with the received check deposit to a user deposit database; responsive to determining that the amount of the check cannot be read from the scanned image of the check, querying the user deposit database for a comparison of the transmitted transaction data associated with the received check deposit with transaction data associated with previous check deposits made by the user; and receiving a result of the comparison from the user deposit database, wherein the querying the user about the amount of the check received for deposit in relation to the amount of the one or more previous check deposits is based on the received result of the comparison.

12. The one or more non-transitory computer-readable media of claim 10, the computer-readable instructions that, when executed by at least one computer, further cause the at least one computer to perform:
identifying a previous check deposit made by the user that has one or more similar characteristics to the received check deposit based on the comparing of the transaction data associated with the received check deposit with the transaction data associated with previous check deposits; querying the user about whether the received check deposit has one or more similar characteristics to the previous check deposit; and responsive to receiving a confirmation from the user that the received check deposit has the one or more similar characteristics to the previous check deposit, determining the amount of the received check deposit based on an amount of the previous check deposit.

13. The one or more non-transitory computer-readable media of claim 12, the computer-readable instructions that, when executed by at least one computer, further cause the at least one computer to perform: responsive to receiving a denial from the user that the received check deposit has the one or more similar characteristics to the previous check deposit, identifying a next previous check deposit made by the user that has one or more similar characteristics to the received check deposit based on the comparing of the transaction data associated with the received check deposit with the transaction data associated with previous check deposits, wherein the next previous check deposit is different from the previous check deposit; and querying the user about whether the received check deposit has one or more similar characteristics to the next previous check deposit.

14. The one or more non-transitory computer-readable media of claim 9, the computer-readable instructions that, when executed by at least one computer, further cause the at least one computer to perform: outputting to a display associated with the computer the scanned image of the check; and requesting a confirmation from the user of the amount of the check based on the scanned image.

15. The one or more non-transitory computer-readable media of claim 10, wherein the transaction data associated with the received check deposit from the user includes one or more of a location of the self-service financial transaction device, a date of the receiving of the check deposit, a time of day of the receiving of the check deposit, a payor identified on the check deposit, and a date identified on the check deposit.

16. An apparatus comprising:
   at least one check deposit unit configured to receive checks for deposit from a user;
   at least one scanner configured to generate, from checks received from the user by the at least one check deposit unit, images of the checks;
   at least one processor; and at least one memory having stored therein computer executable instructions, that when executed by the at least one processor, cause the apparatus to perform a method of: receiving, by the at least one check deposit unit, a check from the user; generating, by the at least one scanner, an image of the check; determining from the image of the check that an amount of the check is unreadable; querying the user about the amount of the check received for deposit in relation to an amount of one or more previous check deposits made by the user and whether the amount of the check received for deposit equals the amount of the one or more previous check deposits made the user amount of one or more previous check deposits made by the user; receiving a response to the query from the user; and determining the amount of the check based on the response received from the user.

17. The apparatus of claim 16, the computer executable instructions, that when executed by the at least one processor, further cause the apparatus to perform: recording transaction data associated with the received check deposit from the user; responsive to determining that the amount of the check is unreadable from the image of the check, retrieving transaction data associated with previous check deposits made by the user; and comparing the transaction data associated with the received check deposit with the retrieved transaction data associated with previous check deposits made by the user.

18. The apparatus of claim 16, the computer executable instructions, that when executed by the at least one processor, further cause the apparatus to perform: recording transaction data associated with the received check deposit from the user; transmitting the recorded transaction data associated with the received check deposit to a user deposit database; responsive to determining that the amount of the check is unreadable from the image of the check, querying the user deposit database for a comparison of the transmitted transaction data associated with the received check deposit with transaction data associated with previous check deposits made by the user; and receiving a result of the comparison from the user deposit database, wherein the querying the user about the amount of the check received for deposit in relation to the amount of the one or more previous check deposits is based on the received result of the comparison.

19. The apparatus of claim 17, the computer executable instructions, that when executed by the at least one processor, further cause the apparatus to perform:
   identifying a previous check deposit made by the user that has one or more similar characteristics to the received check deposit based on the comparing of the transaction data associated with the received check deposit with the transaction data associated with previous check deposits; querying the user about whether the received check deposit has one or more similar characteristics to the previous check deposit; and responsive to receiving a confirmation from the user that the received check deposit has the one or more similar characteristics to the previous check deposit, determining the amount of the received check deposit based on an amount of the previous check deposit.

20. The apparatus of claim 19, the computer executable instructions, that when executed by the at least one processor, further cause the apparatus to perform:
   responsive to receiving a denial from the user that the received check deposit has one or more similar characteristics to the previous check deposit, identifying a next previous check deposit made by the user that has one or more similar characteristics to the received check deposit based on the comparing of the transaction data associated with the received check deposit with the transaction data associated with previous check deposits, wherein the next previous check deposit is different from the previous check deposit; and querying the user about whether the received check deposit has one or more similar characteristics to the next previous check deposit.

* * * * *